Patented Oct. 26, 1954

2,692,833

UNITED STATES PATENT OFFICE 2,692,833

GLASS COMPOSITION

William H. Armistead, Corning, N. Y., assignor to Corning Glass Works, Corning, N. Y., a corporation of New York No Drawing. Application December 17, 1951, Serial No. 262,187

1 Claim. (Cl. 106—53)

This invention relates to novel glass compositions possessing characteristics making them especially suitable for the production of parts utilized in the fabrication of various electrical devices, such as incandescent lamps, electronic discharge tubes and the like.

Glasses which have customarily been utilized for such purposes generally possess a relatively large amount of PbO because of the desirable electrical properties thereby imparted thereto. Lead, however, is currently a strategic material, and compounds thereof have become increasingly more scarce and expensive. It is therefore desirable to produce glasses having properties corresponding to those of such prior high-lead glasses but having substantially lower PbO contents.

Outstanding among such high-lead glasses is that manufactured and sold by Corning Glass Works under code number 0120 (also referred to the trade as G12). This particular glass, which contains approximately 30% PbO, possesses properties that render it especially suitable for the manufacture of stems and flares for incandescent electric lamps, for the production of tubing for use in television picture tubes, fluorescent lamps, and other electronic discharge devices, and for other purposes. Accordingly, this glass has found almost universal acceptance in the trade for such uses.

Any glass that is designed to replace glass number 0120, then, should be provided with properties approximating those of glass number 0120 as closely as possible. In particular, any such glass should have the same or substantially the same working temperature (the temperature at which the viscosity of the glass is $10^4$ poises) and the same or substantially the same thermal expansion coefficient (between 0° and 300° C.) as does glass number 0120. Changing of the flame and other settings on automatic sealing and the like machines adapted for use with glass number 0120 for a particular purpose are thereby avoided, and both glasses can thus be utilized interchangeably.

Any such glass, moreover, should also have a liquidus temperature sufficiently low so that tubing can be satisfactorily drawn therefrom on conventional automatic horizontal-draw or down-draw machines without danger of devitrification. In addition, the electrical resistivity of any such glass should be at least as great as that of glass number 0120 so that articles such as television picture transmitting and receiving tubes respectively made from the two glasses will be the same or similar in their electrical properties.

I have now discovered a glass composition that not only has a lead content significantly less than that of glass number 0120, but also unexpectedly possesses a working temperature, a termal expansion coefficient, and an electrical resistivity approaching those of glass number 0120 exceedingly closely. In accordance with my invention, this new glass has approximately the following composition in weight percent as calculated from its batch:

| | |
|---|---|
| Silica ($SiO_2$) | 60.1 |
| Lead oxide (PbO) | 14.9 |
| Barium oxide (BaO) | 8 |
| Potassium oxide ($K_2O$) | 8.2 |
| Sodium oxide ($Na_2O$) | 4.7 |
| Lithium oxide ($Li_2O$) | 0.5 |
| Alumina ($Al_2O_3$) | 2.1 |
| Boric oxide ($B_2O_3$) | 1 |
| Arsenic oxide ($As_2O_3$) | 0.5 |

A comparison of the above composition with glass number 0120 with regard to the above properties and others is set forth below:

| | New Glass | Glass Number 0120 |
|---|---|---|
| Melting temperature, ° C.[1] | 1,165 | 1,170 |
| Working temperature, ° C | 983 | 975 |
| Softening point, ° C | 648 | 630 |
| Liquidus temperature, ° C | 810 | 673 |
| $Log_{10}$ of volume electrical resistivity at 350° C | 8.0 | 8.0 |
| $Log_{10}$ of volume electrical resistivity at 250° C | 10.1 | 10.1 |
| Thermal expansion coefficient (0–300° C.)×($10^7$) per ° C | 89 | 89 |

[1] The temperature at which the viscosity of the glass becomes less than $10^3$ poises.

From such comparison it will be seen that the melting and working temperatures of the present glass are substantially identical with those of glass number 0120 and that the thermal expansion coefficients of the two glasses are the same. Both glasses can, accordingly, be fabricated simultaneously on the same automatic machinery. While the softening point of the glass of this invention is somewhat higher than that of glass number 0120, such difference is not however sufficient to produce any undesirable effect on the relative workability of these glasses on automatic lamp-making and other machines. Moreover, the liquidus of the present glass is sufficiently low for fully satisfactory use on mechanical tube-drawing apparatus.

It will further be seen that the electrical resistivity at elevated temperatures of the glass of this invention is the same as that of glass number 0120. In actual units both glasses have a resistivity of 100 megohm-cm. at 350° C. and 12,600 megohm-cm. at 250° C.

The proportions of the essential constituents of the above-recited composition are substantially critical but may be varied by not more than plus or minus two to three percent without the desirable properties of the glass becoming unsuitable for the purpose of the invention. In its broader aspect therefore the invention contemplates glass compositions consisting essentially of 58 to 62% $SiO_2$, 12 to 17% PbO, 6.5 to 10% BaO, the total PbO and BaO being 21 to 25%, 6.5 to 9% $K_2O$, 4 to 5.5% $Na_2O$, 0.2 to 1% $Li_2O$, the total $K_2O$, $Na_2O$ and $Li_2O$ being 12.5 to 15%, 1 to 4% $Al_2O_3$, and 0.5 to 2% $B_2O_3$.

The presence in the glass of oxides of metals of the second periodic group other than BaO is generally undesirable because they tend to unduly harden the glass or raise its viscosity objectionably in the annealing range. CaO is by far the worst offender in this respect and its presence is particularly to be avoided especially in amounts more than are ordinarily present as an impurity.

The presence of fluorine in the glass is highly undesirable because it tends to be evolved from the glass at elevated temperatures in a vacuum and thereby to contaminate the electrodes of gaseous discharge lamps and other electronic discharge devices such as television picture tubes embodying such glass and consequently to shorten their useful life.

The following compositions calculated in weight percent from their respective batches will further illustrate the invention:

|  | 2 | 3 | 4 | 5 |
|---|---|---|---|---|
| $SiO_2$ | 60.6 | 58.9 | 60.7 | 61.5 |
| PbO | 13 | 17 | 12 | 14 |
| BaO | 9 | 7 | 10 | 8 |
| $K_2O$ | 7.9 | 8.5 | 8 | 8 |
| $Na_2O$ | 4.7 | 4 | 5 | 4.6 |
| $Li_2O$ | 0.8 | 0.6 | 0.3 | 1 |
| $Al_2O_3$ | 3 | 2.5 | 1.5 | 1.8 |
| $B_2O_3$ | 0.5 | 1 | 2 | 0.6 |
| $As_2O_3$ | 0.5 | 0.5 | 0.5 | 0.5 |

The foregoing compositions contain $As_2O_3$ in amounts which have substantially no effect upon their physical and chemical properties. As is well known, $As_2O_3$ functions as a fining agent, and is volatilized in substantial amount during melting. Other fining agents, such as $Sb_2O_3$ and $Na_2SO_4$, may be used in lieu of $As_2O_3$.

Variations in the proportions of the essential constituents of the present glasses should be confined within the limits set forth above for the following reasons:

Excessive amounts of $SiO_2$ tend to objectionably harden the glass and to raise its liquidus temperature too much for successful mechanical tube-drawing operations. A deficiency of $SiO_2$, on the other hand, results in too great a lowering of the working temperature.

Excessive amounts of PbO also tend towards too great a lowering of the working temperature, but a definciency thereof tends to unduly harden the glass, to lower its electrical resistivity objectionably and to raise its liquidus temperature too much for mechanical tube drawing.

BaO, which is more effective in raising the electrical resistivity of the glass than PbO, also raises its liquidus temperature objectionably when present in an excessive amount. A deficiency of BaO therefore objectionably lowers the electrical resistivity of the glass. Undue softening of the glass and too high a liquidus temperature result from too great a total content of PbO and BaO, while low electrical resistivity and too great a hardening of the glass result from a deficiency thereof.

The strong fluxing power of the alkali metal oxides, $K_2O$, $Na_2O$ and $Li_2O$, and their effect in raising the expansion coefficient of glasses are well known. The total amount of the alkali metal oxides is therefore critical with respect to the working temperature and the expansion coefficient of the present glasses: an excess thereof lowers the working temperature too far and raises the expansion coefficient too much, while a deficiency thereof raises the working temperature too far and lowers the expansion coefficient too much.

The presence of $K_2O$ in the specified amounts is additionally essential in order to maintain the desired high electrical resistivity which the presence of $Na_2O$ tends to lower. While $Na_2O$ is more effective than $K_2O$ in lowering the working temperature, its maximum amount is limited by its undesirable effect in lowering the electrical resistivity of the glass. The presence of $Li_2O$ in the specified amounts is consequently essential in order to provide the extra fluxing power which cannot otherwise be obtained from $K_2O$ and $Na_2O$ on account of their conflicting effects which limit their individual amounts.

The function of $Al_2O_3$ is to make the glass resistant to devitrification during the production of automatic machine-drawn tubing, and at least 1% is essential in the present glass for such purpose. More than 4% however raises the working temperature of the glass objectionably.

On the other hand, $B_2O_3$ tends to lower the working temperature of the present glass and in this respect to compensate for the relatively low PbO content thereof. Moreover $B_2O_3$ is more effective than either PbO or BaO in raising the electrical resistivity of the glass. Accordingly a deficiency of $B_2O_3$ in the present glass results in the working temperature being too high and the electrical resistivity too low. On the other hand, an excess of $B_2O_3$ renders the working temperature too low for the present purpose.

What I claim is:

A glass having approximately the following composition by weight as calculated from its batch:

| | Percent |
|---|---|
| Silica ($SiO_2$) | 60.1 |
| Lead oxide (PbO) | 14.9 |
| Barium oxide (BaO) | 8 |
| Potassium oxide ($K_2O$) | 8.2 |
| Sodium oxide ($Na_2O$) | 4.7 |
| Lithium oxide ($Li_2O$) | 0.5 |
| Alumina ($Al_2O_3$) | 2.1 |
| Boric oxide ($B_2O_3$) | 1 |
| Arsenic oxide ($As_2O_3$) | 0.5 | said glass having a working temperature of approximately 983° C., a thermal expansion coefficient of approximately $89 \times 10^{-7}$ per ° C., and an electrical resistivity of approximately $100 \times 10^6$ ohm-cm. at 350° C.

References Cited in the file of this patent

UNITED STATES PATENTS

| Number | Name | Date |
|---|---|---|
| 2,018,817 | Taylor | Oct. 29, 1935 |
| 2,562,292 | Black et al. | July 31, 1951 |